Feb. 20, 1923.
E. H. SAMUELSON
MOUSE AND RAT TRAP
Filed May 1, 1922
1,446,130
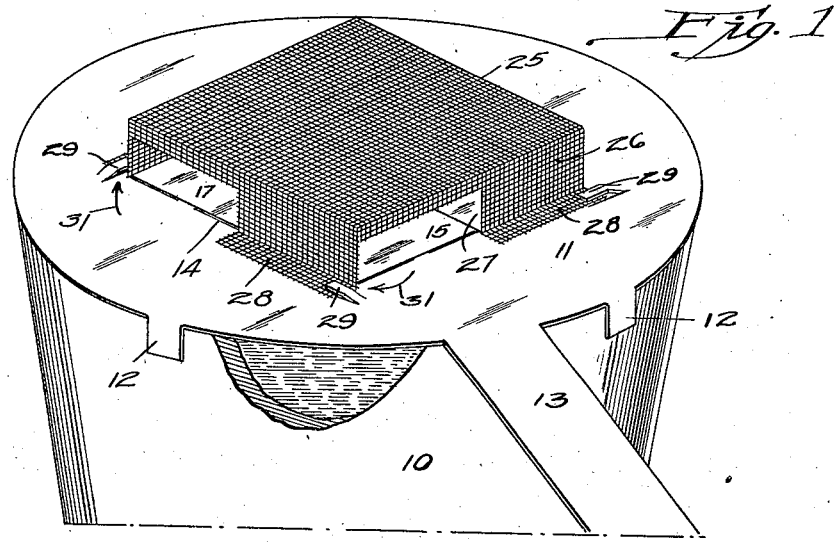
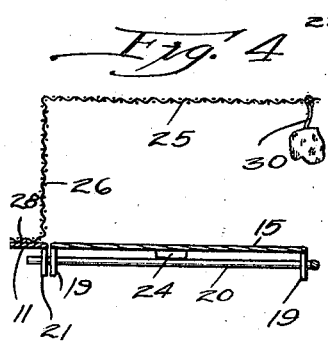
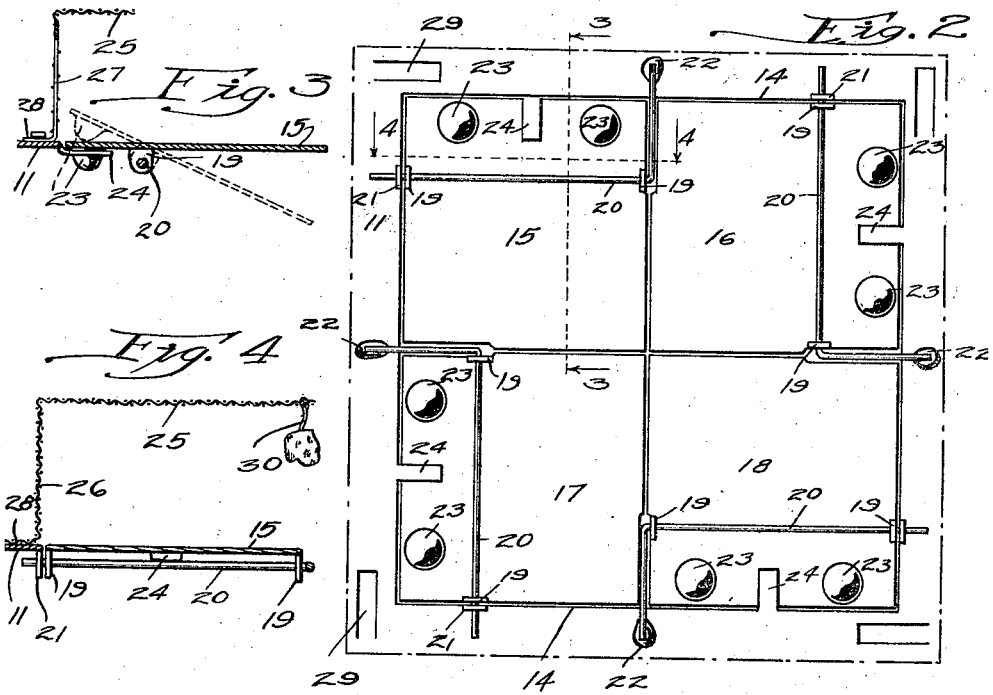
Witness
Lynn Latta
Inventor
Edward H. Samuelson
By Bair & Freeman — Attys.

Patented Feb. 20, 1923.

1,446,130

UNITED STATES PATENT OFFICE.

EDWARD HERMAN SAMUELSON, OF LONG BEACH, CALIFORNIA; AGNES C. SAMUELSON EXECUTRIX OF SAID EDWARD HERMAN SAMUELSON, DECEASED.

MOUSE AND RAT TRAP.

Application filed May 1, 1922. Serial No. 557,587.

*To all whom it may concern:*

Be it known that I, EDWARD H. SAMUELSON, a citizen of the United States, and a resident of Long Beach, in the county of Los Angeles and State of California, have invented a certain new and useful Mouse and Rat Trap, of which the following is a specification.

The object of my invention is to provide a mouse and rat trap of simple, durable and comparatively inexpensive construction.

More particularly, my invention relates to a trap having an opening therein provided with trap doors each covering substantially a fourth of the area of the opening, and so arranged that each door may operate independently of the others.

Still another object is to provide a removable screen adapted to extend over the trap doors, and arranged with openings, each of which correspond with one of the doors of the trap.

Still another object is to so mount the screen covering that it may easily be removed when desired.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my trap arranged on a container.

Figure 2 is an enlarged view of the under side of the trap doors.

Figure 3 is a detailed, sectional view taken on line 3—3 of Figure 2; and Figure 4 is a detailed sectional view taken on line 4—4 of Figure 2.

In the accompanying drawings, I have used the reference numeral 10 to indicate generally a container or bucket, which may be partially filled with water. Arranged on the container 10 is a cover 11 which forms the base of my trap.

The base or cover 11 is provided with flanges 12, which engage the sides of the container 10 for normally holding the base in proper position. A runway 13 is provided so that the mice or rats may pass thereon for getting on top of the base 11.

The base 11 is provided with an enlarged opening 14 through which the mice or rats pass into the center of the container 10.

Trap doors 15, 16, 17, and 18 are provided for covering the opening 14. Each of the trap doors are provided with downturned ears 19 through which is extended a pintle wire 20.

The base 11 adjacent to the opening 14 is provided with downturned ears 21. Each of the ears 21 rest adjacent to one of the ears 19 on the trap doors and receive one end of the pintle wire 20.

In order to anchor the free end of the pintle wire 20, it is necessary to bend the end opposite from the ear 21 at right angles to the main portion of the pintle rod and have it soldered to the base 11, as at 22.

From the construction of the parts just described, it will be seen that each of the trap doors are mounted so as to swing, as shown by the dotted lines in Figure 3 of the drawings.

Each of the trap doors 15, 16, 17, and 18 are provided with counterweights 23, which tend to hold them in proper balance. The pintle rods are arranged nearer one edge of the trap door than the other, which requires the counterweights 23 to hold them in normal position.

In order to hold the trap doors from downward movement in an undesired direction, I provide the fingers or stops 24. The stops 24 are formed on the edge of the opening 14.

I provide a screen covering 25 which is provided with downwardly extending sides 26. Each of the sides 26 are provided with an opening 27. The openings 27 each are so positioned that they serve as an entrance for one of the trap doors.

The side walls 26 may have a portion of the screen bent as at 28 so as to rest upon the base 11, as clearly shown in Figure 1 of the drawings.

In order to hold the screen covering 25 in position, I form fingers 29 out of the base

11, which engage the portions 28 of the covering 25 for normally holding the screen covering in proper position.

The trap may be set by fastening any sort of bait on a wire hook member 30, fastened to the top of the screen covering near the center thereof.

In order to remove the screen covering when it is desired to bait the trap, all that is necessary is to rotate the entire screen covering relative to the base 11 in the direction indicated by the arrow 31.

The moving of the screen covering will cause the portions 28 thereof to disengage the fingers 29.

From the construction of the parts just described, it will be seen that the screen covering may be easily removed or placed in operative position by simply turning it a slight distance relative to the base 11. It will also be seen that the covering is so arranged that an opening is formed on each side thereof so as to serve as an entrance for the mice or rats to pass in upon the trap door.

The fact that the openings are so arranged adds to the feature of the trap, due to the fact that mice will attempt to pass through one of the openings and out through one of the other openings.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

A trap adapted to rest upon a container including a base having an opening therein, trap doors arranged to each cover substantially a fourth of the area of the opening, said trap doors being normally retained in their closed position and adapted to be operated by the weight of a mouse or the like thereon, fingers formed on said base adjacent to said opening, a screen covering spaced above said trap doors, said screen covering having side walls, each of the side walls being arranged with an opening for serving as an entrance for one of the trap doors, a portion of the screen covering adapted to rest against said base and to be engaged by said fingers, the parts being so arranged that the fingers hold the screen covering in position and permit it to be removed by turning the screen covering relative to the base as described.

Des Moines, Iowa, April 15, 1922.

EDWARD HERMAN SAMUELSON.